United States Patent
Bar Joseph et al.

(10) Patent No.: US 12,032,484 B1
(45) Date of Patent: Jul. 9, 2024

(54) ADJUSTING LEAF POINTERS WITH REDUCED CACHE USAGE

(71) Applicant: Dell Products L.P., Round Rock, TX (US)

(72) Inventors: Nir Bar Joseph, Giv'atayim (IL); Vladimir Shveidel, Pardes-Hana (IL); Uri Shabi, Tel Mond (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/299,800

(22) Filed: Apr. 13, 2023

(51) Int. Cl.
  G06F 12/08 (2016.01)
  G06F 12/0875 (2016.01)
  G06F 12/0891 (2016.01)
  G06F 12/10 (2016.01)

(52) U.S. Cl.
  CPC ...... G06F 12/0875 (2013.01); G06F 12/0891 (2013.01); G06F 12/10 (2013.01); G06F 2212/1044 (2013.01)

(58) Field of Classification Search
  CPC ............ G06F 12/0875; G06F 12/0873; G06F 12/0891
  USPC ........................................................ 711/118
  See application file for complete search history.

(56) References Cited

U.S. PATENT DOCUMENTS

| | | | |
|---|---|---|---|
| 11,068,455 B2 | 7/2021 | Shabi et al. | |
| 11,151,056 B2 | 10/2021 | Shveidel et al. | |
| 2003/0061189 A1* | 3/2003 | Baskins | G06F 16/9027 |
| 2006/0020638 A1* | 1/2006 | Shadmon | G06F 16/322 |
| 2010/0293338 A1* | 11/2010 | Krishnaprasad | G06F 16/9014 |
| | | | 711/E12.001 |
| 2021/0011667 A1* | 1/2021 | Soukhman | G06F 3/0652 |

OTHER PUBLICATIONS

Zalstein, Dror, et al.; "Managing Changes To Metadata in a Data Storage System," U.S. Appl. No. 18/188,568, filed Mar. 23, 2023.
Tamilarasan, Ashok, et al.; "Processing Pages Marked for Deletion," U.S. Appl. No. 17/568,180, filed Jan. 4, 2022.

* cited by examiner

Primary Examiner — Than Nguyen
(74) Attorney, Agent, or Firm — BainwoodHuang (57) ABSTRACT

A technique of updating leaf pointers in a storage system includes creating a point-in-time copy of persisted metadata pages and scanning the copy for leaf pointers that point to redirected virtual blocks. Metadata pages that contain leaf pointers that point to redirected virtual blocks are read from cache and processed for updates, but no action is taken in cache for metadata pages that do not contain such leaf pointers.

20 Claims, 5 Drawing Sheets

ADJUSTING LEAF POINTERS WITH REDUCED CACHE USAGE

BACKGROUND

Data storage systems are arrangements of hardware and software in which storage processors are coupled to arrays of non-volatile storage devices, such as magnetic disk drives, electronic flash drives, and/or optical drives. The storage processors, also referred to herein as "nodes," service storage requests arriving from host machines ("hosts"), which specify blocks, files, and/or other data elements to be written, read, created, deleted, and so forth. Software running on the nodes manages incoming storage requests and performs various data processing tasks to organize and secure the data elements on the non-volatile storage devices.

Some storage systems arrange data using trees of mapping pointers that provide paths for pointing logical blocks to virtual blocks, which point to physical blocks. A tree of mapping pointers may include leaf pointers that point directly to virtual blocks. Generally, the virtual blocks do not point back to the leaf pointers. A complication can thus arise when moving a virtual block (e.g., when performing defragmentation or garbage collection), as the leaf pointers that point to an old virtual block cannot immediately be found and updated to reflect the location of a new virtual block. In such cases, the storage system may instead add a redirect pointer to the old virtual block, so that the old virtual block points to the new virtual block. An associated physical block can still be found, but at the cost of an extra hop between the two virtual blocks.

After a while, a storage system may perform a background scan of all leaf pointers and adjust any leaf pointers that point to redirected virtual blocks. The background scan proceeds by issuing read requests to cache for metadata pages and checking the pages to determine whether they contain any leaf pointers to redirected virtual blocks. Pages containing leaf pointers that point to such blocks are updated so that they point instead to the new virtual blocks. Reading the metadata pages from cache ensures that most recent versions are obtained, and that any changes in the metadata blocks are eventually persisted to disk when the cache is flushed.

SUMMARY

Unfortunately, the above-described procedure for updating leaf pointers can consume significant cache space. It can also cause contention in cache for metadata pages as many locks need to be taken. In addition, most of the metadata pages read into cache may be unlikely to be read again in the near future, causing the cache to become polluted. What is needed is a way of updating leaf pointers without overly burdening the cache.

The above need is addressed at least in part with an improved technique of updating leaf pointers in a storage system. The technique includes creating a point-in-time copy of persisted metadata pages and scanning the copy for leaf pointers that point to redirected virtual blocks. Metadata pages that contain leaf pointers that point to redirected virtual blocks are read from cache and processed for updates, but no action is taken in cache for metadata pages that do not contain such leaf pointers.

Advantageously, leaf pointers in the storage system may be updated without having to read all metadata pages into cache. Rather, the metadata pages read into cache may be limited to only the pages that contain leaf pointers to redirected virtual blocks. Such pages are typically a small minority of the total number of metadata pages scanned. The level of cache usage is thus dramatically reduced, avoiding cache contention and pollution, and enabling the storage system to operate more efficiently.

Certain embodiments are directed to a method of updating leaf pointers in a data storage system having a cache. The method includes creating, outside of the cache, a point-in-time copy of persistent metadata pages, the persistent metadata pages including leaf pointers for locating data. The method further includes scanning the point-in-time copy of the persistent metadata pages to identify a first set of metadata pages that includes leaf pointers that point to redirected virtual blocks and a second set of metadata pages that does not include leaf pointers that point to redirected virtual blocks. The method still further includes updating the first set of metadata pages in the cache but not reading the second set of metadata pages from the cache.

Other embodiments are directed to a computerized apparatus constructed and arranged to perform a method of updating leaf pointers, such as the method described above. Still other embodiments are directed to a computer program product. The computer program product stores instructions which, when executed on control circuitry of a computerized apparatus, cause the computerized apparatus to perform a method of updating leaf pointers, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique of updating leaf pointers in a storage system includes creating a point-in-time copy of persisted metadata pages and scanning the copy for leaf pointers that point to redirected virtual blocks. Metadata pages that contain leaf pointers that point to redirected virtual blocks are read from cache and processed for updates, but no action is taken in cache for metadata pages that do not contain such leaf pointers.

Figure 1:
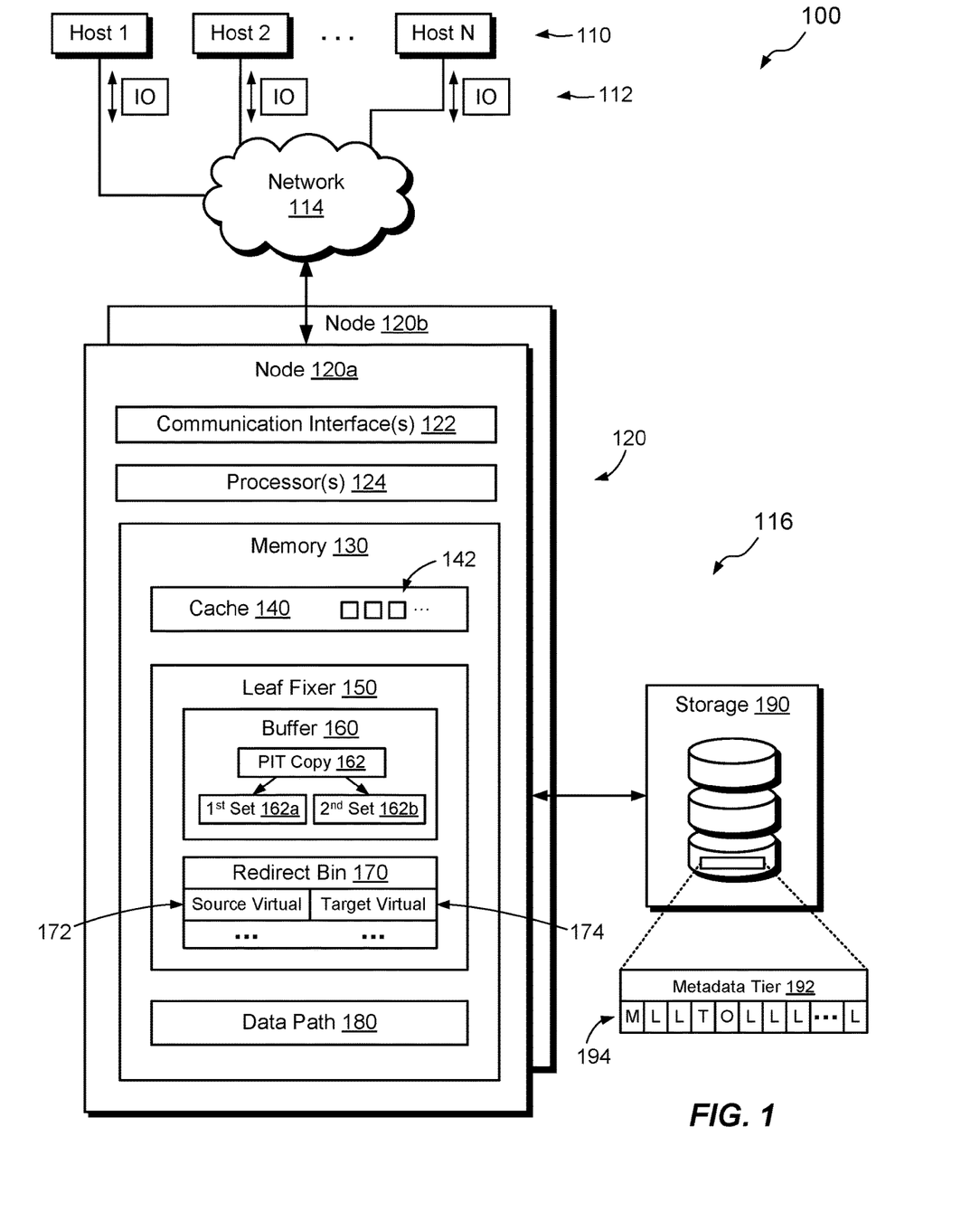
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes one or more nodes 120 (e.g., node 120a and node 120b), and storage 190, such as magnetic disk drives, electronic flash drives, and/or the like. Nodes 120 may be provided as circuit board assemblies or blades, which plug into a chassis (not shown) that encloses and cools the nodes. The chassis has a backplane or midplane for interconnecting the nodes 120, and additional connections may be made among nodes 120 using cables. In some examples, the nodes 120 are part of a storage cluster, such as one which contains any number of storage appliances, where each appliance includes a pair of nodes 120 connected to shared storage. In some arrangements, a host application runs directly on the nodes 120, such that separate host machines 110 need not be present. No particular hardware configuration is required, however, as any number of nodes 120 may be provided, including a single node, in any arrangement, and the node or nodes 120 can be any type or types of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where separate hosts 110 are provided, such hosts 110 may connect to the node 120 using various technologies, such as Fibre Channel, iSCSI (Internet small computer system interface), NVMeOF (Nonvolatile Memory Express (NVMe) over Fabrics), NFS (network file system), and CIFS (common Internet file system), for example. As is known, Fibre Channel, iSCSI, and NVMeOF are block-based protocols, whereas NFS and CIFS are file-based protocols. The node 120 is configured to receive I/O requests 112 according to block-based and/or file-based protocols and to respond to such I/O requests 112 by reading or writing the storage 190.

The depiction of node 120a is intended to be representative of all nodes 120. As shown, node 120a includes one or more communication interfaces 122, a set of processors 124, and memory 130. The communication interfaces 122 include, for example, SCSI target adapters and/or network interface adapters for converting electronic and/or optical signals received over the network 114 to electronic form for use by a node 120. The set of processors 124 includes one or more processing chips and/or assemblies, such as numerous multi-core CPUs (central processing units). The memory 130 includes both volatile memory, e.g., RAM (Random Access Memory), and non-volatile memory, such as one or more ROMs (Read-Only Memories), disk drives, solid state drives, and the like. The set of processors 124 and the memory 130 together form control circuitry, which is constructed and arranged to carry out various methods and functions as described herein. Also, the memory 130 includes a variety of software constructs realized in the form of executable instructions. When the executable instructions are run by the set of processors 124, the set of processors 124 is made to carry out the operations of the software constructs. Although certain software constructs are specifically shown and described, it is understood that the memory 130 typically includes many other software components, which are not shown, such as an operating system, various applications, processes, and daemons.

As further shown in FIG. 1, the memory 130 "includes," i.e., realizes by execution of software instructions, a cache 140, a leaf fixer 150, and a data path 180. The cache 140 is configured to hold metadata pages, such as leaf pages and other pages of metadata that have recently been read or written, as well as data pages, such as pages of user data that have recently been read or written.

The leaf fixer 150 is configured to adjust leaf pointers that point to redirected source virtual blocks, so that the leaf pointers point instead to target virtual blocks. In accordance with improvements hereof, the leaf fixer 150 includes a buffer 160 and a redirect bin 170. The buffer 160 may be implemented using volatile memory to promote fast access, but some examples may provide the buffer in persistent memory. The buffer 160 is configured to store a point-in-time copy 162 of persistent metadata pages 194, which may be persistently stored in a dedicated metadata tier 192 or in some other storage region (or regions) within the storage 190. The persistent metadata pages 194 may include, in some examples, "top" pages (T), "mid" pages (M), and leaf pages (L), as well as other metadata pages (O). In an example, each top, mid, and leaf page contains an array of block pointers, with block pointers in leaf pages referred to herein as "leaf pointers."

The redirect bin 170 is configured to associate identifiers 172 of source virtual blocks with corresponding identifiers 174 of target virtual blocks 174 to which the source virtual blocks have been redirected. In some examples, the redirect bin 170 is provided as a table. Preferably, the redirect bin 170 is a key-value store in which identifiers 172 of source virtual blocks form keys and identifiers 174 of destination virtual blocks form values. As an optimization, the redirect bin 170 may be provided as a hash table that associates hashes of identifiers 172 of source virtual blocks with corresponding identifiers 174 of target virtual blocks. The identifiers 172 and 174 may be addresses or other elements that uniquely identify and locate virtual blocks.

The data path 180 is configured to map logical blocks (e.g., host addressable data blocks) to corresponding virtual blocks, and to further map virtual blocks to corresponding physical blocks backed by storage 190. Mapping in the data path 180 from logical blocks to virtual blocks is specified, for example, by mapping pointers, which include leaf pointers. Mapping from virtual blocks to physical blocks is specified, for example, by pointers within the virtual blocks.

In example operation, the hosts 110 issue I/O requests 112 to the data storage system 116. A node 120 receives the I/O requests 112 at the communication interfaces 122 and initiates further processing. Such processing may include performing reads and writes of user data and configuring metadata for mapping the user data.

Over time, the storage system 116 may relocate data, such as when performing defragmentation or garbage collection, or when performing new writes to existing data. In some examples, relocating data may involve allocating new virtual blocks and redirecting old (source) virtual blocks to point to newly allocated (target) virtual blocks. As the number of redirections grows, the storage system 116 becomes less efficient, as access to relocated data involves an extra hop (between source and target virtual blocks). It also consumes extra virtual blocks, which may be a limited resource. To restore desired efficiency, the data storage system 116 may operate the leaf fixer 150, which scans leaf pointers and updates any leaf pointers it finds that point to redirected virtual blocks. The leaf fixer 150 thus eliminates the extra hop. It also allows source virtual blocks to be freed and reclaimed.

In accordance with improvements hereof, the leaf fixer 150 makes a point-in-time copy 162 of the persistent metadata pages 194 in the buffer 160. The point-in-time copy 162 captures the state of the persistent metadata pages 194 at a particular point in time. The leaf fixer 150 may then scan the point-in-time copy 162 to identify a first set 162a of metadata pages that contain leaf pointers to redirected virtual blocks and a second set 162b of metadata pages that do not contain leaf pointers to redirected virtual blocks.

The leaf fixer 150 processes each page in the first set 162a using cache 140. For example, each page in the first set 162a may be read from cache 140, updated to point all of its leaf pointers to target virtual blocks, and then written back to cache 140, where it is flushed to the metadata tier 192 in the usual manner (e.g., on a flushing cycle managed by the cache 140). As all pages in the first set 162a of metadata pages are processed in cache 140, it is known that all such pages are completely up to date and include any recent changes, including changes that were made after the point-in-time copy 162 was created.

As for the second set 162b of metadata pages, no particular action is required, as the pages either are not leaf pages or are leaf pages but contain no leaf pointers requiring adjustment. In general, it is expected that the second set 162b will include many more pages than the first set 162a, such as between 20 and 100 times more pages. Thus, as compared with prior approaches that process all metadata pages through cache, the number of pages processed through cache using the instant approach is typically between one and two orders of magnitude smaller.

One should appreciate that the first set 162a of metadata pages and the second set 162b of metadata pages may be identified in any suitable way. For example, the leaf fixer 150 may identify pages as belonging to one set or the other on a page-by-page basis, e.g., as the leaf fixer 150 scans and processes the pages contained in the point-in-time copy 162. Thus, it is not necessary for the membership of either set 162a or 162b to be entirely known in advance before any pages can be processed. Indeed, the membership of the sets 162a and 162b may not be completely determined until a scan is complete, by which time all of the leaf pointers may have been fixed.

In an example, the leaf fixer 150 determines whether a leaf pointer points to a redirected virtual block by performing a lookup of the leaf pointer's address in the redirect bin 170. For example, the leaf fixer 150 accesses a leaf pointer, obtains the pointed-to address, hashes the address, and performs a hash-key lookup of the hashed address in the redirect bin 170. A match within the redirect bin 170 confirms that the leaf pointer points to a redirected virtual block and thus requires fixing.

In an example, the leaf fixer 150 ensures the adequacy of using the point-in-time copy 162 for identifying leaf pointers to redirected virtual blocks, rather than using the cache 140, by enforcing certain constraints. A first constraint is that all dirty metadata pages 142 in the cache 140 must be flushed to the metadata tier 192 prior to creating the point-in-time copy 162. This ensures that the point-in-time copy 162 contains all recent changes in metadata pages. A "dirty" metadata page 142 is one that differs from the corresponding persistent page 194 in the metadata tier 192.

A second constraint is that, after flushing to the metadata tier 192, the cache 140 is not allowed to hold any dirty leaf pages that point to redirected virtual blocks. To enforce this second constraint, leaf pages containing leaf pointers to source virtual blocks are modified, prior to being placed in cache, such that they point instead to target virtual blocks. In an example, the cache 140 receives requests to write leaf pages that contain leaf pointers. In response to a request to write a leaf page, the cache 140 performs lookups in the redirect bin 170 for each leaf-pointer address in the leaf page. If any matches are found in the redirect bin, the affected leaf pointers are updated by substituting the current leaf-pointer addresses (to source virtual blocks) with addresses of the associated target virtual blocks obtained from the redirect bin 170. Accordingly, all leaf pages written to cache 140 after making the point-in-time copy 162 contain leaf pointers that point to target virtual blocks rather than to source virtual blocks.

With the above-described constraints in place, it can be assured that all leaf pointers to redirected virtual blocks are written to the persistent metadata tier 192 prior to making the point-in-time copy 162, and that no new writes to cache 140 will point to redirected source virtual blocks after the point-in-time copy is made. These constraints are sufficient for ensuring that the point-in-time copy 162 may be used for identifying leaf pointers to redirected virtual blocks and that the cache 140 need not be accessed for this purpose.

Figure 2:
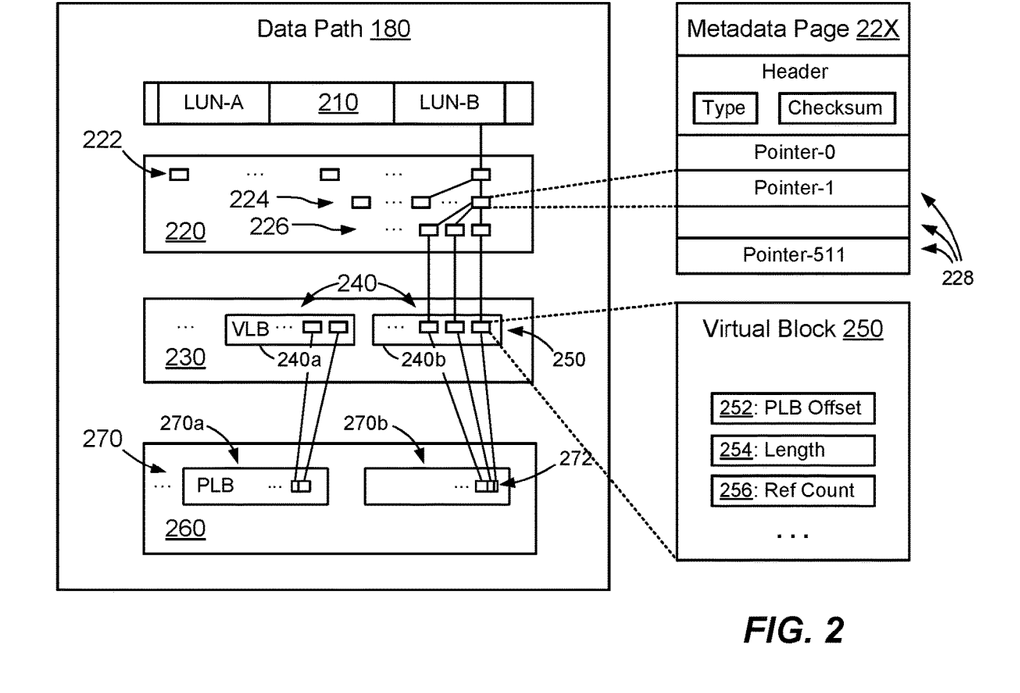
FIG. 2 is a block diagram of an example data path of FIG. 1.

FIG. 2 shows an example arrangement of the data path 180 of FIG. 1. Here, data path 180 includes a logical "namespace" layer 210, a mapping layer 220, a virtualization layer 230, and a physical layer 260. The namespace layer 210 is a large, logical address space configured to organize data objects, such as host-accessible LUNs (Logical UNits), file systems, virtual machine disks, and the like, with LUN-A and LUN-B being shown as examples. Logical addresses in the namespace layer 210 identify respective logical data blocks, where each logical data block represents a uniform amount of storage space, such as 4 KB (kilobytes), 8 kB, 64 KB, or the like. The data storage system 116 typically has a predefined logical block size, which sets the logical size of all data blocks. Block sizes in the namespace layer 210 are "logical" because they represent uncompressed data blocks. Corresponding compressed data blocks are found in the physical layer 260.

Mapping layer 220 contains multiple levels of mapping pointers that establish paths from logical blocks in the namespace layer 210 to corresponding virtual blocks 250 in the virtualization layer 230. In an example, the mapping layer 220 is implemented using a B-tree that includes three levels of pointers, tops 222, mids 224, and leaves 226. Tops, mids, and leaves may be arranged in arrays, which are stored in pages. For example, each top array points to a large number of mid arrays, each mid array points to a large number of leaf arrays, and each leaf array points to a large number of virtual blocks 250. If logical data blocks are 4 kB and the "large number" above is 512, then each leaf array points to 2 MB, each mid array points to 1 GB (gigabyte), and each top array points to 512 GB of logical space. In this manner, the mapping layer 230 can map a very large number of logical blocks in the namespace layer 210 to corresponding virtual blocks 250 in the virtualization layer 230.

An example metadata page 22X is shown to the upper-right of FIG. 2. The metadata page 22X may be representative of top pages, mid pages, and leaf pages, for example. The persistent metadata pages 194 of FIG. 1 provide persistent versions of the metadata pages 22X. Each metadata page 22X may include a header and an associated array of pointers. The header may include a "Type," e.g., a designation of whether the page is a top page, mid page, or leaf page, and a checksum, such as a CRC (cyclic redundancy check) of the associated array of pointers. Each of the pointers points to mapping elements in the level immediately below. For example, pointers in top metadata pages 22X point to mids, pointers in mid metadata pages 22X point to leaves, and pointers in leaf metadata pages 22X (leaf pointers 228) point to virtual blocks 250.

The virtualization layer 230 arranges virtual blocks 250 into arrays called VLBs (virtual large blocks) 240, where each VLB 240 contains a large number of virtual blocks 250, such as 512. Assuming a 4-kB logical block size, each VLB 240 can map up to 2 MB of uncompressed data blocks. Two VLBs 240a and 240b are specifically shown, but the storage system 116 may include hundreds or thousands of VLBs or more. VLBs serve critical functions in storage system 116, such as supporting data block mobility and deduplication.

Each virtual block 250 points to a single respective physical block 272 in the physical layer 260. As shown to the lower-right of FIG. 2, each virtual block 250 stores an offset 252, a length 254, and a reference count 256. The offset 252 defines the starting point of a corresponding compressed data block in a PLB, and the length 254 defines the length of the compressed block. The reference count 256 indicates the number of leaf pointers 228 that point to the virtual block. Virtual blocks 250 may include additional information (not shown), such as a checksum, a compression technique, and other metadata.

The physical layer 260 includes multiple PLBs 270. Two PLBs 270a and 270b are specifically shown, but there may be hundreds, thousands, or more PLBs present.

Figure 3:
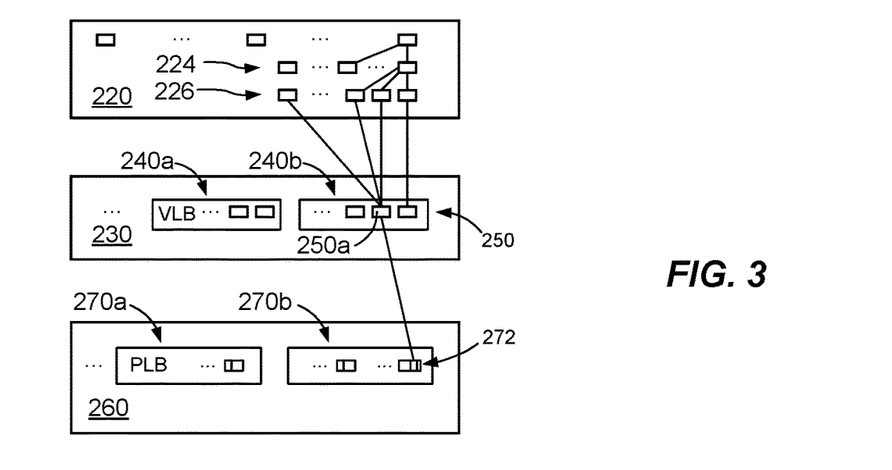
FIG. 3 is a block diagram showing an example arrangement for performing deduplication in the data path of FIGS. 1 and 2.

FIG. 3 shows an example arrangement in which a virtual block 250a is pointed to by multiple leaf pointers 228. Certain details of the data path 180 have been omitted from FIG. 3 for simplicity. Here, three different leaf pointers 228 point to the same virtual block 250a, making the reference count 256 of virtual block 250 equal to three. This arrangement demonstrates that the same virtual block 250a (and the same corresponding physical block) may be shared among multiple logical addresses in the namespace 210, e.g., as a consequence of deduplication or some other block-sharing arrangement.

Figure 4A:
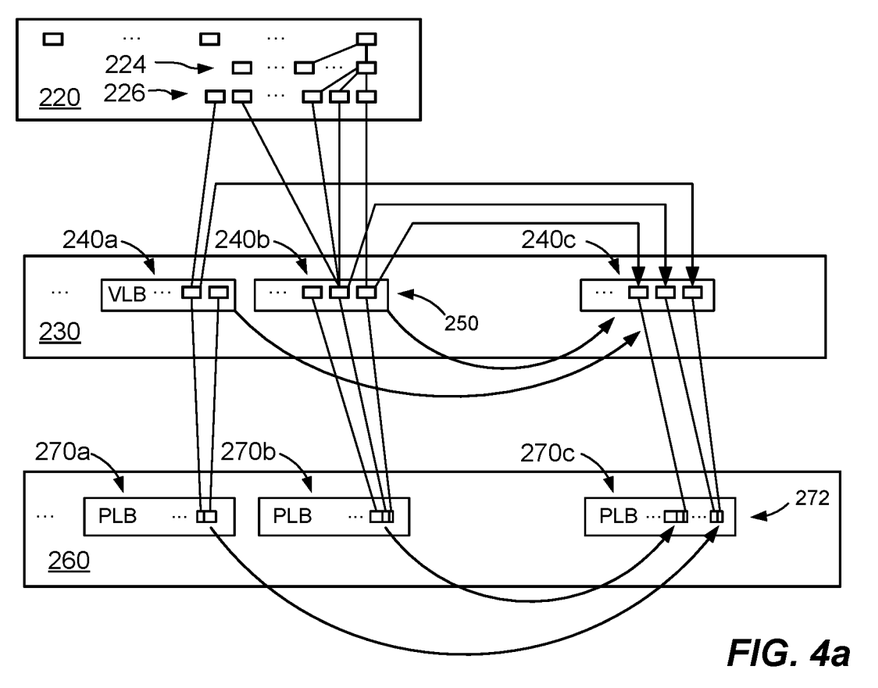
FIGS. 4a and 4b are block diagrams showing an example arrangement for performing data consolidation in the data path of FIGS. 1-3.
Figure 4B:
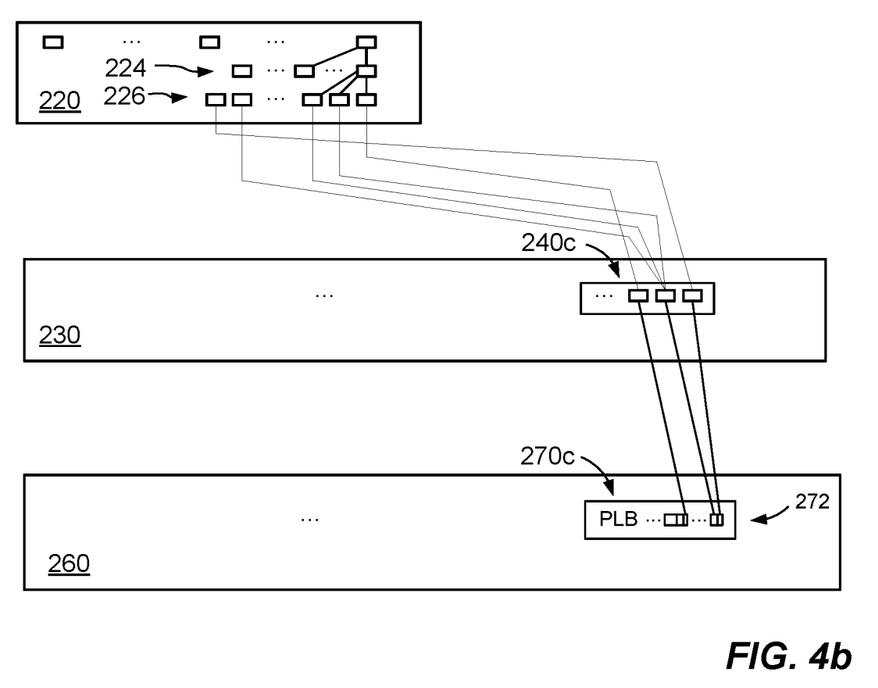

FIGS. 4a and 4b show an example of data consolidation that gives rise to redirected virtual blocks. As shown in FIG. 4a, the storage system 116 attempts to consolidate storage space by copying the contents of PLBs 270a and 270b into a newly allocated PLB 270c. In an example, consolidating PLBs also entails consolidating corresponding VLBs. Thus, not only are the physical blocks of PLBs 270a and 270b copied to the new PLB, but also the virtual blocks 250 of VLBs 240a and 240b are copied to a new VLB 240c. As virtual blocks 250 do not have back-pointers to leaves (and the leaves may be of any number), the consolidation of VLBs is addressed by inserting redirect pointers into the virtual blocks 250 being moved. Thus, a redirect pointer is written into each original virtual block (source virtual block), with each redirect pointer pointing to a corresponding target virtual block in the new VLB 240c. Only three redirect paths are shown in FIG. 4a (for simplicity), but one should appreciate that all redirected source virtual blocks point to corresponding target virtual blocks in VLB 240c. Once all the source virtual blocks in VLBs 240a and 240b have been redirected, the PLBs 270a and 270 can be freed and reclaimed.

The depicted arrangement is not optimally efficient. To access a physical data block 272 from a leaf, the storage system 116 must follow the leaf to the source virtual block, follow the redirect pointer to the target virtual block, and then follow the pointer in the target virtual block to the physical block. In addition, the source virtual block is effectively wasted. These inefficiencies may be rectified by operating the leaf fixer 150.

FIG. 4b shows example results of running the leaf fixer 150. Here, the extra hops between source virtual blocks and target virtual blocks have been removed and the leaf pointers 228 have been adjusted to point directly to target virtual blocks in VLB 240c. Also, as the original VLBs 240a and 240b are no longer being used, such VLBs can be freed and reclaimed.

Figure 5:
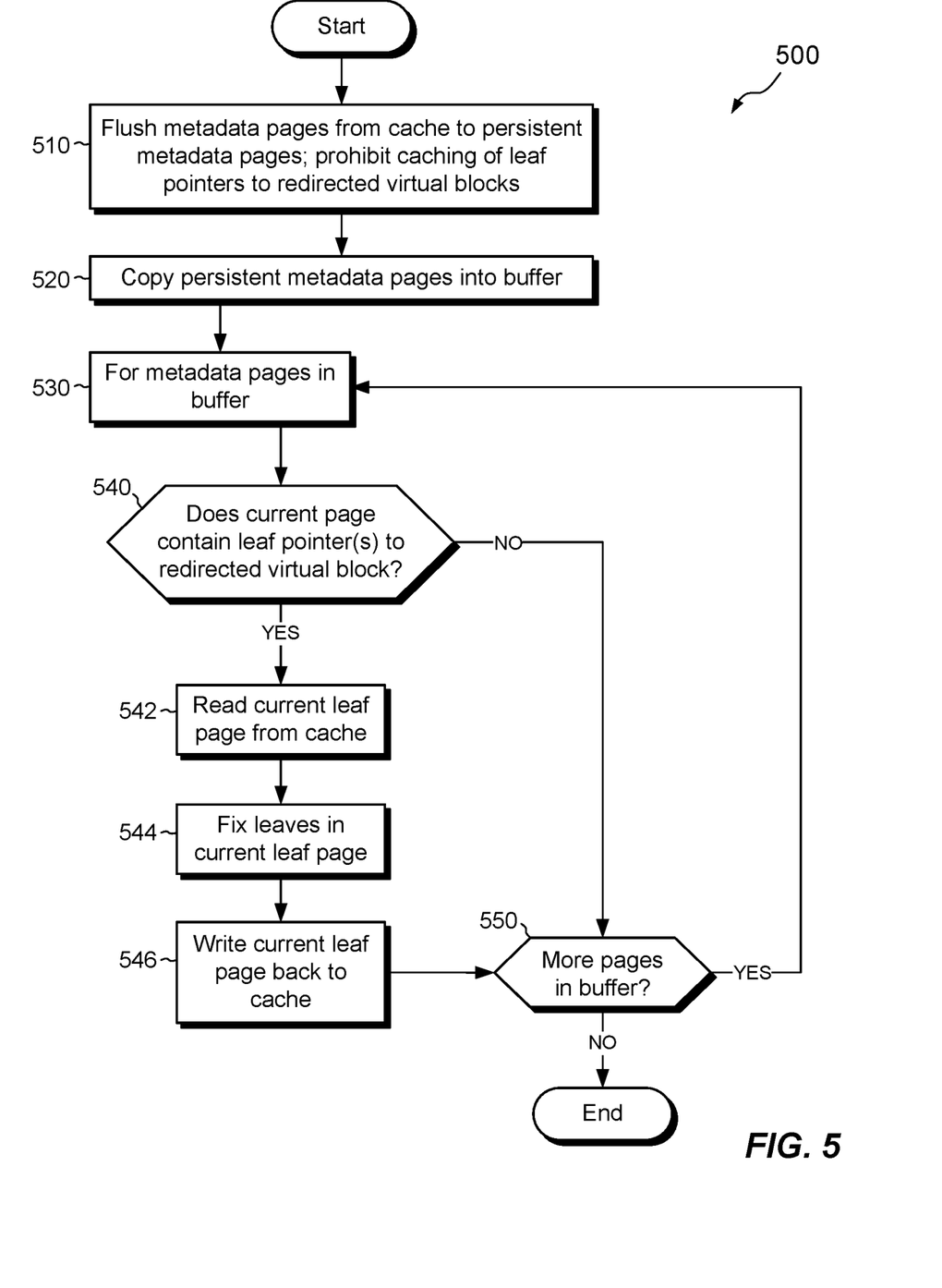
FIG. 5 is a flowchart showing an example method of processing metadata pages.
Figure 6:
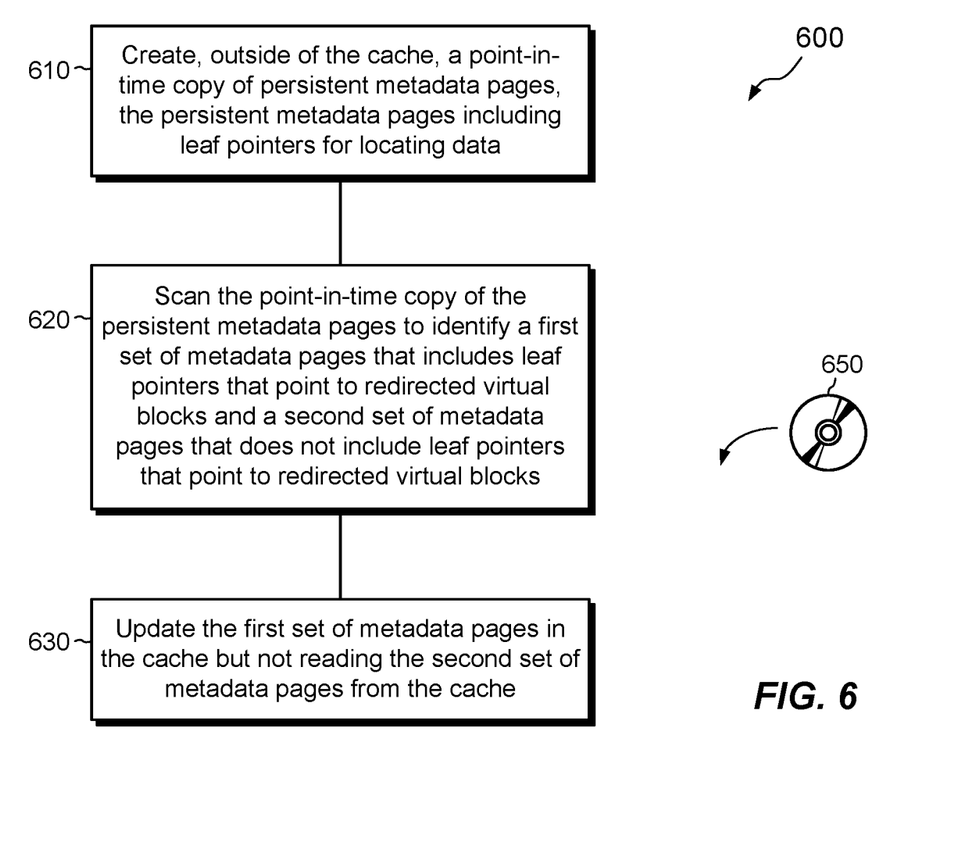
FIG. 6 is a flowchart showing an example method of updating leaf pointers in a storage system.

FIGS. 5 and 6 show example methods 500 and 600 that may be carried out in connection with the environment 100. The methods 500 and 600 are typically performed, for example, by the software constructs described in connection with FIG. 1, which reside in the memory 130 of a node 120 and are run by the set of processors 124. The various acts of methods 500 and 600 may be ordered in any suitable way. Accordingly, embodiments may be constructed in which acts are performed in orders different from those illustrated, which may include performing some acts simultaneously.

The method 500 of FIG. 5 is directed to processing metadata pages. Here, we start by assuming that the data storage system 116 is operating in a usual manner, such as by servicing I/O requests 112 from hosts 110 and using cache 140 to store most recent versions of accessed data and metadata. No particular initial state is required, however.

At 510, the data storage system 116 flushes dirty metadata pages 142 from cache 140 to the persistent metadata pages 194 in the metadata tier 192. Such flushing ensures that the persistent metadata pages 194 store the most recent updates to metadata in the cache. At the same time the metadata are flushed, or in some cases earlier, the cache 140 enforces a policy of prohibiting writes of leaf pages containing leaf pointers 228 to redirected virtual blocks 250. Thus, at least as of the time that the metadata pages are flushed, no new writes are allowed into the cache that contain pointers to redirected virtual blocks. Rather, all new writes of pointers to redirected virtual blocks must point to target virtual blocks rather than to source virtual blocks.

At 520, the storage system 116 creates a point-in-time copy 162 of the persistent metadata pages 194 in the buffer 160. The point-in-time copy 162 should be created after flushing the cache 140 and while the prohibition is in place against writing pointers to redirected virtual blocks in the cache (act 510). In some examples, the point-in-time copy is created of the entire metadata tier 192. In other examples, only a portion of the metadata tier 192 or other region is copied, i.e., the portion or region that contains leaf pages.

At 530, the leaf fixer 150 begins scanning the metadata pages in the point-in-time copy 162. At 540, for each metadata page encountered, the leaf fixer 150 determines whether the current metadata page contains any leaf pointers to redirected virtual blocks. In cases where the current metadata page is not a leaf page (e.g., it is instead a mid page, top page, or other page), the determination can be made easily by checking the type indicator in the header of the metadata block. Any page other than a leaf page is excluded and produces a "NO" determination at 540. For pages that are leaves, the leaf fixer 150 may check each leaf pointer 228 in the page by performing a lookup for the pointer address in the redirect bin 170, e.g., by hashing the pointer address and determining whether the hash result matches any entry in the redirect bin. A match in the redirect bin confirms that the respective leaf pointer points to a redirected virtual block. A failure to match does not identify a redirected virtual block.

If a match 540 is found, operation for the current leaf page proceeds to 542, whereupon the leaf page is read from cache 140. At 544, any leaf pointers in the page to redirected virtual blocks are "fixed" so that they point instead to corresponding target blocks, e.g., the target blocks indicated by matches in the redirect bin 170. At 546, once all leaf pointers in the current leaf page have been fixed, the leaf page is written back to cache 140, where it remains until it is flushed to the metadata tier 192.

Processing the leaf page in cache ensures that the leaf page contains all recent changes since the point-in-time copy 162 was created. As each leaf page contains many leaf pointers (e.g., 512), there may be many opportunities for other leaf pointers in the same page to change.

Once the current leaf page has been written back to cache at 546, operation proceeds to 550, where a new current page is obtained from the point-in-time copy 162. The above acts are then repeated for the new page.

Returning to 540, if it is determined that the current metadata page contains no leaf pointers that point to redirected virtual blocks, then operation proceeds directly to 550, where a new metadata page is obtained from the point-in-time copy 162 and evaluated for changes. It can thus be seen that the "YES" path from determination 540 is followed for each of the above-described first set 162a of metadata pages, and that the "NO" path is followed for each of the above-described second set 162b of metadata pages.

At the conclusion of method 500, all leaf pointers to redirected virtual blocks in metadata pages stored in the point-in-time copy 162 have been fixed, so that they point to respective targets.

In some examples, the redirect bin 170 is large and it becomes efficient to perform leaf fixing in cycles, with each cycle working with a respective portion of the redirect bin 170. For example, each portion of the redirect bin 170 may include thousands or more entries, with an "entry" defined as a key-value pair that associates a source virtual block identifier 172 with a corresponding target virtual block identifier 174. In such cases, the method 500 may be performed for one portion of the redirect bin at a time. As a result, a "NO" determination at act 540 is not always determinative of whether any leaf pointer in the current metadata page points to a redirected virtual block. For example, a virtual block address may still be listed in the redirect bin 170 but may not be included in the portion of the redirect bin being used for the current run of the method 500. Rather, it is only after running the method 500 on all portions of the redirect bin that all pointers to redirected virtual blocks can be found. In some examples, a portion of the redirect bin 170 used for a current run of the method 500, including all entries within the portion, may be purged once the method 500 is completed for that portion.

In very rare cases, metadata pages in the point-in-time copy 162 may be corrupted. Such corruption may arise from read-write race conditions against the persistent metadata pages 194. As a safeguard, the method 500 may include a data consistency check (not shown), which may operate, for example, by computing a checksum of each metadata page and comparing the checksum with the one stored in the header of the same page. If the checksums do not match, the page may be corrupted. In these rare cases, the method 500 may reread the pages from cache before determining whether the pages contain pointers to redirected virtual blocks.

The method 600 in FIG. 6 is directed to updating leaf pointers and provides a summary of some of the features described above. At 610, a point-in-time copy 162 is created of persistent metadata pages 194. The point-in-time copy 162 is created outside of cache 140 and is akin to a snapshot of current metadata pages. The persistent metadata pages 194 include leaf pointers 228 for locating data.

At 620, the point-in-time copy 162 of the persistent metadata pages 194 is scanned to identify a first set 162a of metadata pages that includes leaf pointers 228 that point to redirected virtual blocks 250 and a second set of metadata pages 162b that does not include leaf pointers that point to redirected virtual blocks.

At 630, the first set of metadata pages 162a is updated in cache 140 but the second set of metadata pages 162b is not read from cache 140. For example, no action may be taken for the second set 162b of metadata pages.

An improved technique has been described for updating leaf pointers 228 in a storage system 116. The technique includes creating a point-in-time copy 162 of persisted metadata pages 194 and scanning the copy 162 for leaf pointers 228 that point to redirected virtual blocks 250. Metadata pages that contain leaf pointers that point to redirected virtual blocks are read from cache 140 and processed for updates, but no action is taken in cache 140 for metadata pages that do not contain such leaf pointers. Advantageously, leaf pointers in the storage system may be updated without having to read all metadata pages into cache. Cache usage is thus dramatically reduced, avoiding cache contention and pollution, and enabling the storage system to operate more efficiently.

Having described certain embodiments, numerous alternative embodiments or variations can be made. For example, although embodiments have been described that involve one or more data storage systems, other embodiments may involve computers, including those not normally regarded as data storage systems. Such computers may include servers, such as those used in data centers and enterprises, as well as general purpose computers, personal computers, and numerous devices, such as smart phones, tablet computers, personal data assistants, and the like.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should be interpreted as meaning "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of updating leaf pointers in a data storage system having a cache, comprising:
    creating, outside of the cache, a point-in-time copy of persistent metadata pages, the persistent metadata pages including leaf pointers for locating data;
    scanning the point-in-time copy of the persistent metadata pages to identify a first set of metadata pages that includes leaf pointers that point to redirected virtual blocks and a second set of metadata pages that does not include leaf pointers that point to redirected virtual blocks; and
    updating the first set of metadata pages in the cache but not reading the second set of metadata pages from the cache.

2. The method of claim 1, wherein second set of metadata pages is at least ten times as numerous as the first set of metadata pages.

3. The method of claim 1, wherein accessing the cache for updating the first set of metadata pages includes (i) reading the first set of metadata pages into the cache, (ii) adjusting the leaf pointers that point to redirected virtual blocks in the first set of metadata pages to point to respective target virtual blocks, and (iii) writing the updated metadata pages back to the cache.

4. The method of claim 1, further comprising, prior to creating the point-in-time copy of the persistent metadata pages, flushing a plurality of dirty metadata pages from the cache to the persistent metadata pages, the plurality of dirty metadata pages including leaf pointers to redirected virtual blocks.

5. The method of claim 4, further comprising, after flushing the plurality of dirty metadata pages, prohibiting writes to the cache of metadata pages that include leaf pointers to redirected virtual blocks.

6. The method of claim 5, wherein prohibiting writes to the cache of metadata pages that include leaf pointers to redirected source virtual blocks includes:
    receiving, by the cache, a request to write a metadata page that includes a leaf pointer to a redirected virtual block;
    updating the leaf pointer in the received metadata page to substitute an identifier of a source virtual block with an identifier of corresponding target virtual block; and
    writing the updated metadata page to the cache.

7. The method of claim 4, wherein scanning the point-in-time copy of the persistent metadata pages includes performing lookups for leaf pointers in a redirect bin, the redirect bin associating multiple source virtual blocks with corresponding target virtual blocks to which the source virtual blocks have been pointed, and wherein the method further comprises identifying the leaf pointers that point to redirected virtual blocks as leaf pointers for which performing a lookup in the redirect bin results in a match.

8. The method of claim 7, wherein the redirect bin is configured as a key-value store in which a key is formed as a hash of an identifier of a source virtual block and wherein a value is a corresponding identifier of a target virtual block.

9. The method of claim 7, wherein scanning the point-in-time copy of the persistent metadata pages is performed in multiple cycles for a portion of redirect bin at a time.

10. The method of claim 9, wherein the method further comprises deleting entries within a portion of the redirect bin upon completing a scan of the point-in-time copy against the entries within the portion.

11. A computerized apparatus, comprising control circuitry that includes a set of processors coupled to memory, the control circuitry constructed and arranged to:
    create, outside of a cache, a point-in-time copy of persistent metadata pages, the persistent metadata pages including leaf pointers for locating data;
    scan the point-in-time copy of the persistent metadata pages to identify a first set of metadata pages that includes leaf pointers that point to redirected virtual blocks and a second set of metadata pages that does not include leaf pointers that point to redirected virtual blocks; and
    update the first set of metadata pages in the cache but not read the second set of metadata pages from the cache.

12. The computerized apparatus of claim 11 wherein, prior to creating the point-in-time copy of the persistent metadata pages, the control circuitry is further constructed and arranged to:
    flush a plurality of dirty metadata pages from the cache to the persistent metadata pages, the plurality of dirty metadata pages including leaf pointers to redirected virtual blocks; and
    after flushing the plurality of dirty metadata pages, prohibit writes to the cache of metadata pages that include leaf pointers to redirected virtual blocks.

13. A computer program product including a set of non-transitory, computer-readable media having instructions which, when executed by control circuitry of a computerized apparatus, cause the computerized apparatus to perform a method of updating leaf pointers in a data storage system having a cache, the method comprising:
    creating, outside of the cache, a point-in-time copy of persistent metadata pages, the persistent metadata pages including leaf pointers for locating data;
    scanning the point-in-time copy of the persistent metadata pages to identify a first set of metadata pages that includes leaf pointers that point to redirected virtual blocks and a second set of metadata pages that does not include leaf pointers that point to redirected virtual blocks; and updating the first set of metadata pages in the cache but not reading the second set of metadata pages from the cache.

14. The computer program product of claim 13, wherein the method further comprises, prior to creating the point-in-time copy of the persistent metadata pages, flushing a plurality of dirty metadata pages from the cache to the persistent metadata pages, the plurality of dirty metadata pages including leaf pointers to redirected virtual blocks.

15. The computer program product of claim 14, wherein the method further comprises, after flushing the plurality of dirty metadata pages, prohibiting writes to the cache of metadata pages that include leaf pointers to redirected virtual blocks.

16. The computer program product of claim 15, wherein prohibiting writes to the cache of metadata pages that include leaf pointers to redirected source virtual blocks includes:
- receiving, by the cache, a request to write a metadata page that includes a leaf pointer to a redirected virtual block;
- updating the leaf pointer in the received metadata page to substitute an identifier of a source virtual block with an identifier of corresponding target virtual block; and
- writing the updated metadata page to the cache.

17. The computer program product of claim 14, wherein scanning the point-in-time copy of the persistent metadata pages includes performing lookups for leaf pointers in a redirect bin, the redirect bin associating multiple source virtual blocks with corresponding target virtual blocks to which the source virtual blocks have been pointed, and wherein the method further comprises identifying the leaf pointers that point to redirected virtual blocks as leaf pointers for which performing a lookup in the redirect bin results in a match.

18. The method of claim 17, wherein the redirect bin is configured as a key-value store in which a key is formed as a hash of an identifier of a source virtual block and wherein a value is a corresponding identifier of a target virtual block.

19. The computer program product of claim 17, wherein scanning the point-in-time copy of the persistent metadata pages is performed in multiple cycles for a portion of redirect bin at a time.

20. The computer program product of claim 19, wherein the method further comprises deleting entries within a portion of the redirect bin upon completing a scan of the point-in-time copy against the entries within the portion.

* * * * *